(12) United States Patent
Otomo et al.

(10) Patent No.: US 10,172,021 B2
(45) Date of Patent: Jan. 1, 2019

(54) COMMUNICATION METHOD, NON-TRANSITORY COMPUTER-READABLE RECORDING MEDIUM, AND COMMUNICATION SYSTEM

(71) Applicant: FUJITSU LIMITED, Kawasaki-shi, Kanagawa (JP)

(72) Inventors: Toshiya Otomo, Kawasaki (JP); Koichiro Yamashita, Hachioji (JP); Takahisa Suzuki, Yokohama (JP); Hiromasa Yamauchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 39 days.

(21) Appl. No.: 15/421,691

(22) Filed: Feb. 1, 2017

(65) Prior Publication Data

US 2017/0142602 A1    May 18, 2017

Related U.S. Application Data

(63) Continuation of application No. PCT/JP2014/071808, filed on Aug. 20, 2014.

(51) Int. Cl.
*H04W 24/04* (2009.01)
*H04W 40/22* (2009.01)
*H04W 4/04* (2009.01)
*H04W 84/18* (2009.01)

(52) U.S. Cl.
CPC ............. *H04W 24/04* (2013.01); *H04W 4/04* (2013.01); *H04W 40/22* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2005/0047390 A1* | 3/2005 | Park | H04L 45/28 370/351 |
| 2009/0147714 A1* | 6/2009 | Jain | H04W 52/0216 370/311 |
| 2011/0235504 A1 | 9/2011 | Nozaki et al. | |

(Continued)

FOREIGN PATENT DOCUMENTS

| | | |
|---|---|---|
| EP | 2337277 | 6/2011 |
| JP | 2011-205556 | 10/2011 |

(Continued)

OTHER PUBLICATIONS

International Search Report dated Nov. 18, 2014 in corresponding International Application No. PCT/JP2014/071808.

(Continued)

*Primary Examiner* — Robert C Scheibel
(74) *Attorney, Agent, or Firm* — Staas & Halsey LLP

(57) ABSTRACT

A first node included in a first layer determines whether there has occurred a failure in a sink node included in a second layer subordinate to the first layer. The first node requests a second node included in the second layer to collect information of a third node included in a third layer subordinate to the second layer when the first node determines that there has occurred a failure in the sink node. The first node determines a fourth node serving as a substitute for the failed sink node included in the second layer on a basis of the information of the third node collected by the second node.

4 Claims, 19 Drawing Sheets

(56) References Cited

U.S. PATENT DOCUMENTS

| | | | |
|---|---|---|---|
| 2011/0268139 A1* | 11/2011 | Caracas ................ | H04J 3/0652 370/503 |
| 2014/0010069 A1* | 1/2014 | Abbasi ................ | H04W 40/248 370/221 |
| 2014/0211743 A1 | 7/2014 | Nakano et al. | |
| 2014/0254433 A1* | 9/2014 | Abe ...................... | H04W 40/02 370/256 |
| 2014/0325257 A1* | 10/2014 | Alfadhly ............. | G06F 11/2002 714/4.11 |

FOREIGN PATENT DOCUMENTS

| | | |
|---|---|---|
| JP | 2011-223419 | 11/2011 |
| JP | 2013-5043 | 1/2013 |
| JP | 2013-232963 | 11/2013 |
| WO | WO 2013/065483 A1 | 5/2013 |

OTHER PUBLICATIONS

Communication Pursuant to Article 94(3) EPC, dated Feb. 16, 2018, in European Application No. 14900305.5 (5 pp.).

* cited by examiner

FIG.3
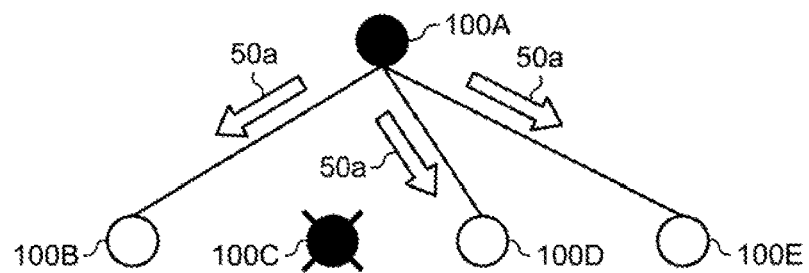
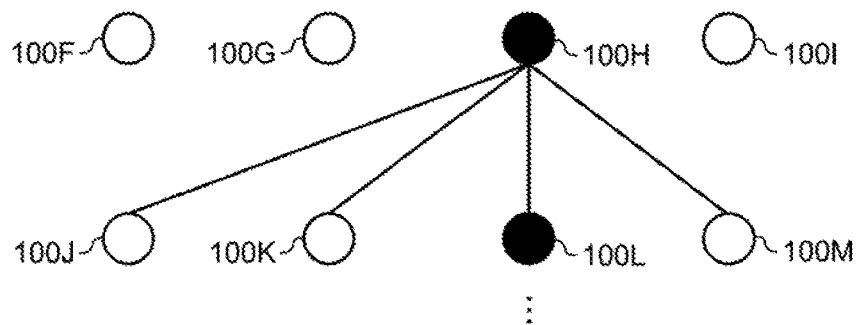
FIG.4
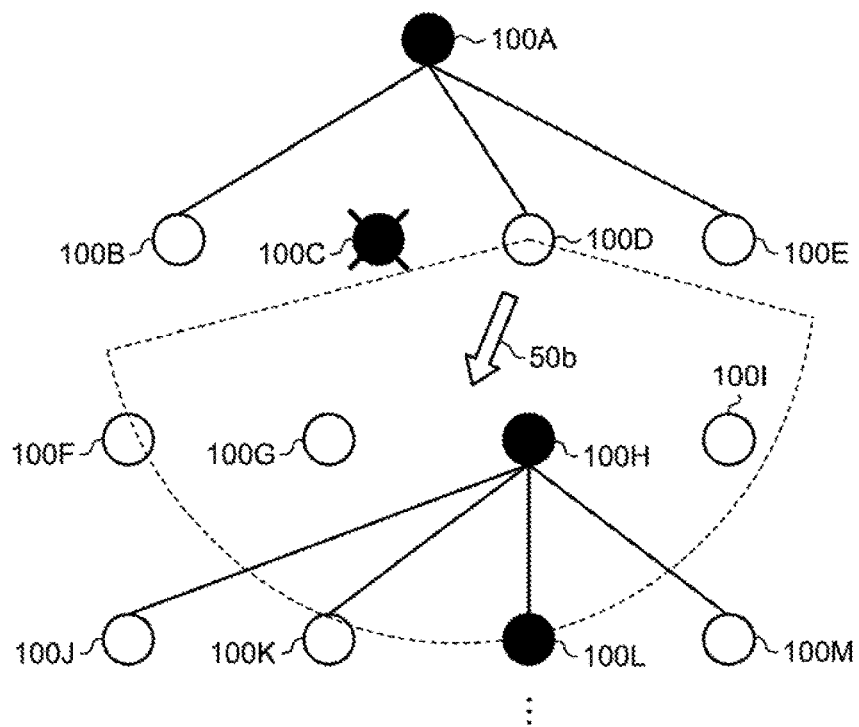

FIG.7
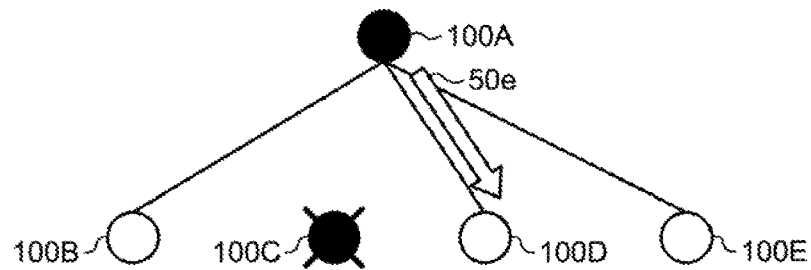
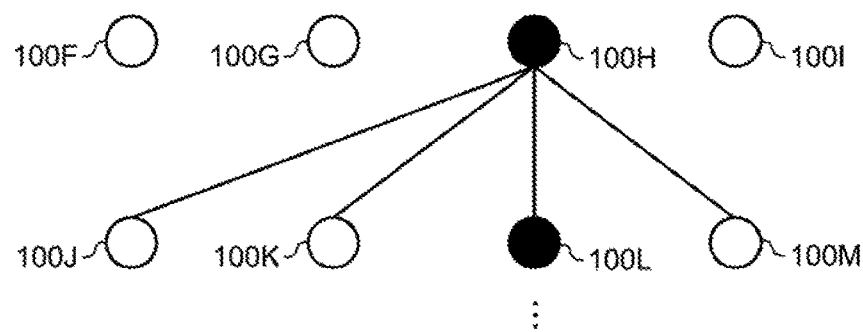
FIG.8
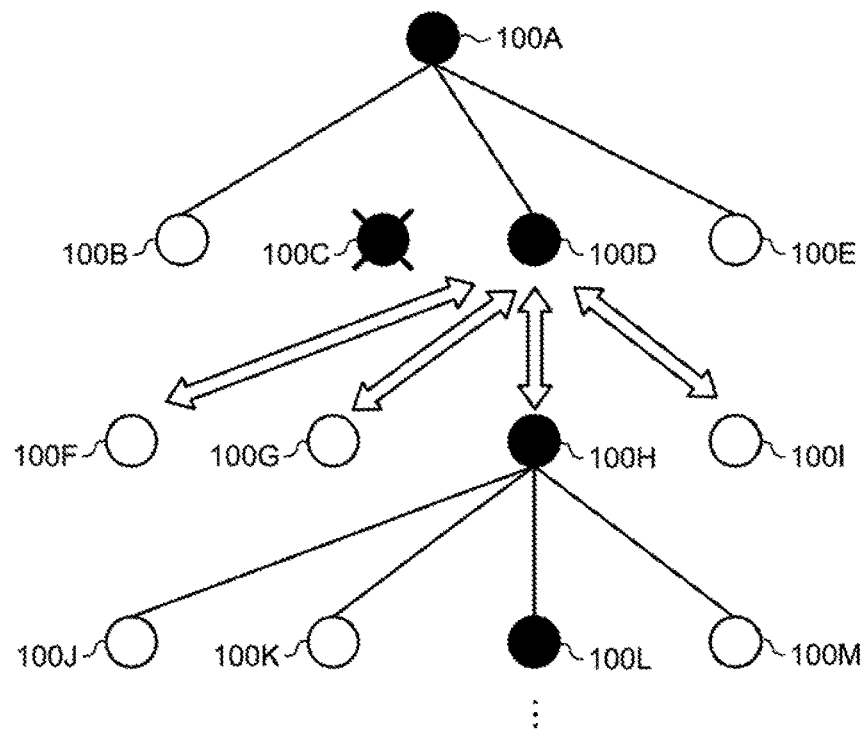

FIG.11
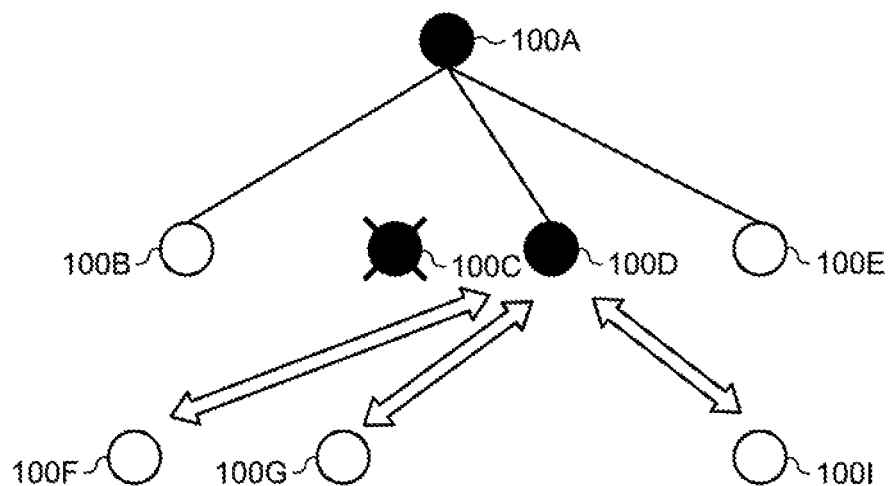
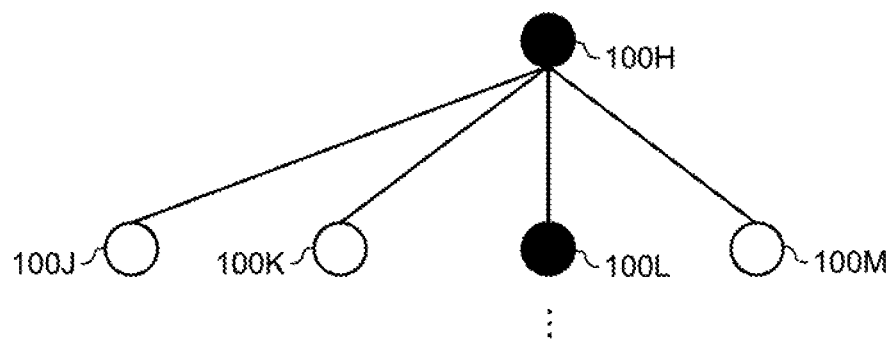

FIG.12
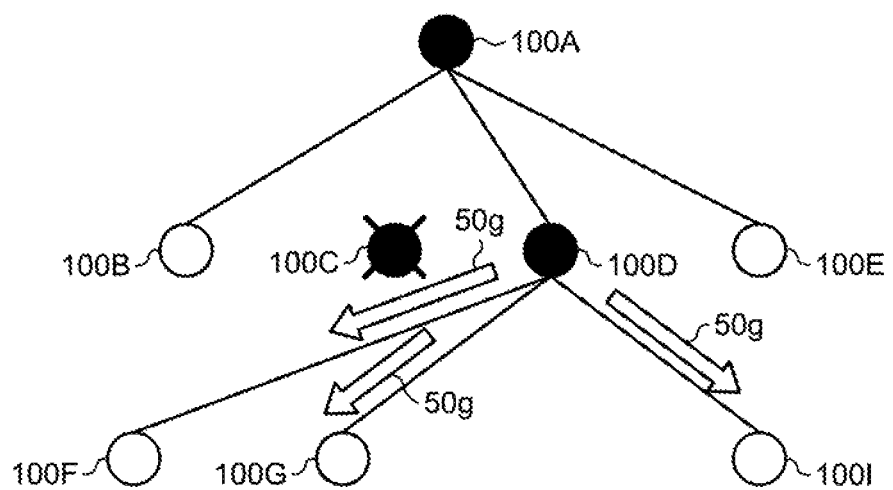
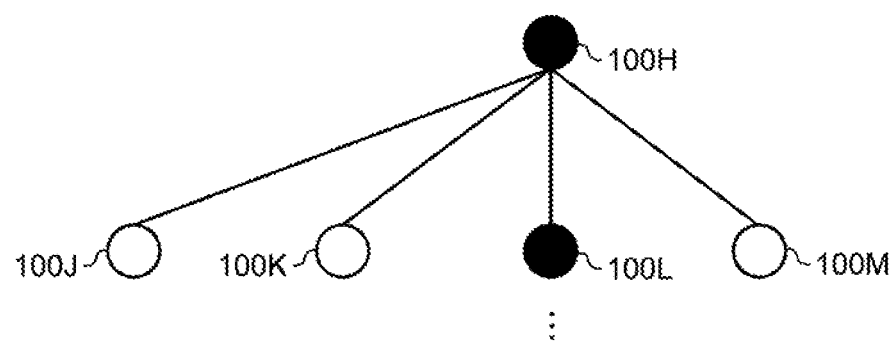

FIG.15

| SENDER NODE IDENTIFICATION INFORMATION | LIST INFORMATION | | RECEIVED POWER |
| --- | --- | --- | --- |
| | NODE IDENTIFICATION INFORMATION | SINK NODE FLAG | |
| NODE 100D | NODE 100F | OFF | ○○ dBm |
| | NODE 100G | OFF | ○○ dBm |
| | NODE 100H | ON | ○○ dBm |
| | NODE 100I | OFF | ○○ dBm |

| SENDER NODE IDENTIFICATION INFORMATION | LIST INFORMATION | | RECEIVED POWER |
|---|---|---|---|
| | NODE IDENTIFICATION INFORMATION | SINK NODE FLAG | |
| NODE 100B | NODE 100F | OFF | ○○ dBm |
| | NODE 100G | OFF | ○○ dBm |

134b

| SENDER NODE IDENTIFICATION INFORMATION | LIST INFORMATION | | RECEIVED POWER |
|---|---|---|---|
| | NODE IDENTIFICATION INFORMATION | SINK NODE FLAG | |
| NODE 100D | NODE 100F | OFF | ○○ dBm |
| | NODE 100G | OFF | ○○ dBm |
| | NODE 100H | ON | ○○ dBm |
| | NODE 100I | OFF | ○○ dBm |

134c

| SENDER NODE IDENTIFICATION INFORMATION | LIST INFORMATION | | RECEIVED POWER |
|---|---|---|---|
| | NODE IDENTIFICATION INFORMATION | SINK NODE FLAG | |
| NODE 100E | NODE 100G | OFF | ○○ dBm |
| | NODE 100H | ON | ○○ dBm |
| | NODE 100I | OFF | ○○ dBm |

⋮

COMMUNICATION METHOD, NON-TRANSITORY COMPUTER-READABLE RECORDING MEDIUM, AND COMMUNICATION SYSTEM

CROSS-REFERENCE TO RELATED APPLICATION

This application is a continuation application of International Application PCT/JP2014/071808, filed on Aug. 20, 2014, and designating the U.S., the entire contents of which are incorporated herein by reference.

FIELD

The present invention relates to a communication method etc.

BACKGROUND

There is a wireless sensor network (WSN) in which a number of nodes provided with a sensor are disposed and each node exchanges data by wireless communications, thereby collecting various types of measurement information from each node. For example, the WSN employs network structures, which include the tree type and the mesh type.

FIG. 22 is an explanatory view (1) illustrating an example of the tree type network structure. The tree type network structure, which provides a relatively easy parent-child relation management and motivation control, is suitable for those nodes that have only a weak processing capability. On the other hand, for the tree type network structure, only one node or a plurality of nodes may have a child node in each layer.

In the following descriptions, the node that has a child node will be expressed as a sink node, as appropriate.

In the example illustrated in FIG. 22, the network structure of a network 10 has one sink node in each layer. Of nodes 11 to 23 included in the network 10, the sink nodes having a child node are the nodes 11, 13, 18, and 22. Like the network 10, a network having one sink node in each layer is easy to manage as compared with a network having a plurality of sink nodes.

Here, in the tree type network structure, a failure of a sink node makes it impossible to communicate with all the nodes subordinate to the failed sink node. FIG. 23 is an explanatory view illustrating a problem of the tree type network structure. For example, in FIG. 23, a failure having occurred at the node 13 serving as a sink node disables the nodes 11, 12, 14, and 15 to communicate with the nodes 16 to 18 and nodes subordinate to the node 22 (not illustrated). Thus, the tree type network structure is low in robustness.

In contrast to this, for the mesh type network structure, each node is connected like a mesh, so that there exist a plurality of types of paths to a destination node. For this reason, even when a node has failed, it is possible to continue data communications by selecting a path that detours around the failed node, thus providing enhanced robustness.

On the other hand, even with the tree type network structure, robustness can be enhanced by setting the radio wave output from each node to a relatively higher level. FIG. 24 is an explanatory view (2) illustrating an example of the tree type network structure. The network structure of FIG. 24 is the same as that of FIG. 22. In the example illustrated in FIG. 24, it is assumed that the radio wave output from the node 11 is set to a relatively higher level. In this case, even when the node 13 serving as a sink node has failed, the radio wave from the node 11 reaches the node 18, and thus the nodes 11, 12, 14, and 15 can continue communications with subordinate nodes.

Patent Literature 1: Japanese Laid-open Patent Publication No. 2011-223419

Patent Literature 2: Japanese Laid-open Patent Publication No. 2011-205556

However, the aforementioned conventional technique does not enhance the robustness of networks without increases in costs during operation.

The aforementioned mesh type network structure can provide an enhanced robustness. However, the structure sends and receives packets for periodically updating paths, thus causing an increase in cost during operation. Furthermore, even the technique for increasing the level of radio wave output from each node may also cause an increase in cost during operation due to an increase in power consumption.

SUMMARY

According to an aspect of the embodiment of the invention, a communication method including: first determining at which a first node included in a first layer determines whether there has occurred a failure in a sink node included in a second layer subordinate to the first layer; requesting at which the first node requests a second node included in the second layer to collect information of a third node included in a third layer subordinate to the second layer when the first node has determined that there has occurred a failure in the sink node, using the processor; and second determining at which the first node determines a fourth node serving as a substitute for the failed sink node included in the second layer on a basis of the information of the third node collected by the second node.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is an explanatory view (2) illustrating the processing of a network according to an embodiment.

FIG. 4 is an explanatory view (3) illustrating the processing of a network according to an embodiment.

FIG. 7 is an explanatory view (6) illustrating the processing of a network according to an embodiment.

FIG. 8 is an explanatory view (7) illustrating the processing of a network according to an embodiment.

FIG. 11 is an explanatory view (10) illustrating the processing of a network according to an embodiment.

FIG. 12 is an explanatory view (11) illustrating the processing of a network according to an embodiment.

FIG. 15 is a view illustrating an example data structure of neighborhood exploration report information.

FIG. 16 is a view illustrating an example data structure of a management table.

DESCRIPTION OF EMBODIMENTS

A description will now be made in more detail to a communication method, a communication program, and a communication system according to an embodiment of the present invention with reference to the drawings. Note that the invention is not to be limited by the embodiments.

Figure 1:
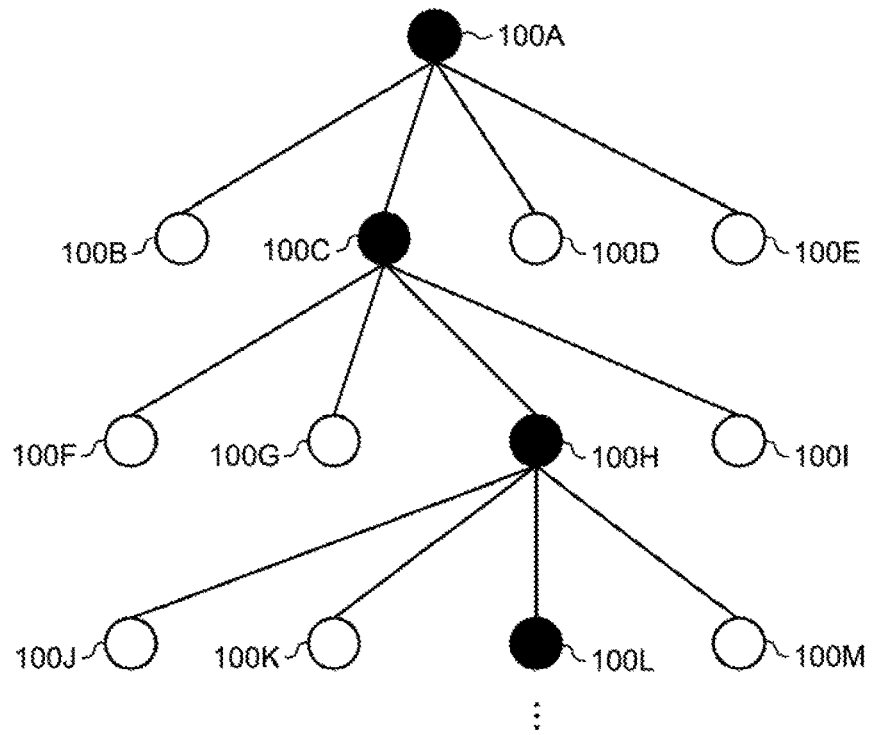
FIG. 1 is a view illustrating the configuration of a network according to an embodiment.

FIG. 1 is a view illustrating the configuration of a network according to an embodiment. As illustrated in FIG. 1, this network has a tree type network structure and is an example of communication systems. The network illustrated in FIG. 1 has nodes 100A, 100B, 100C, 100D, 100E, 100F, 100G, 100H, 100I, 100J, 100K, 100L, and 100M. Although not illustrated here, this network may also have other nodes than the nodes 100A to 100M. In the following descriptions, the node 100A to the node 100M will be expressed collectively as a node 100, as appropriate.

Of the nodes 100A to 100M, the nodes 100A, 100C, 100H, and 100L are a sink node. The node 100A performs wireless communications with the nodes 100B, 100C, 100D, and 100E. The node 100C performs wireless communications with the nodes 100A, 100F, 100G, 100H, and 100I. The node 100H performs wireless communications with the nodes 100C, 100J, 100K, 100L, and 100M.

It is assumed that the administrator sets in advance which node 100 performs wireless communications with which node 100. It is also assumed that the administrator sets in advance which node 100 serves as a sink node. The sink node receives measurement information from a child node, and then transmits measurement information to a subordinate sink node. For example, the node 100A receives measurement information from the nodes 100B, 100D, and 100E, and then transmits the received measurement information to the node 100C.

As will be described below, when there has occurred a failure in a sink node, a network according to this embodiment determines a node serving as a substitute for the failed sink node and then reconstructs the network.

Figure 2:
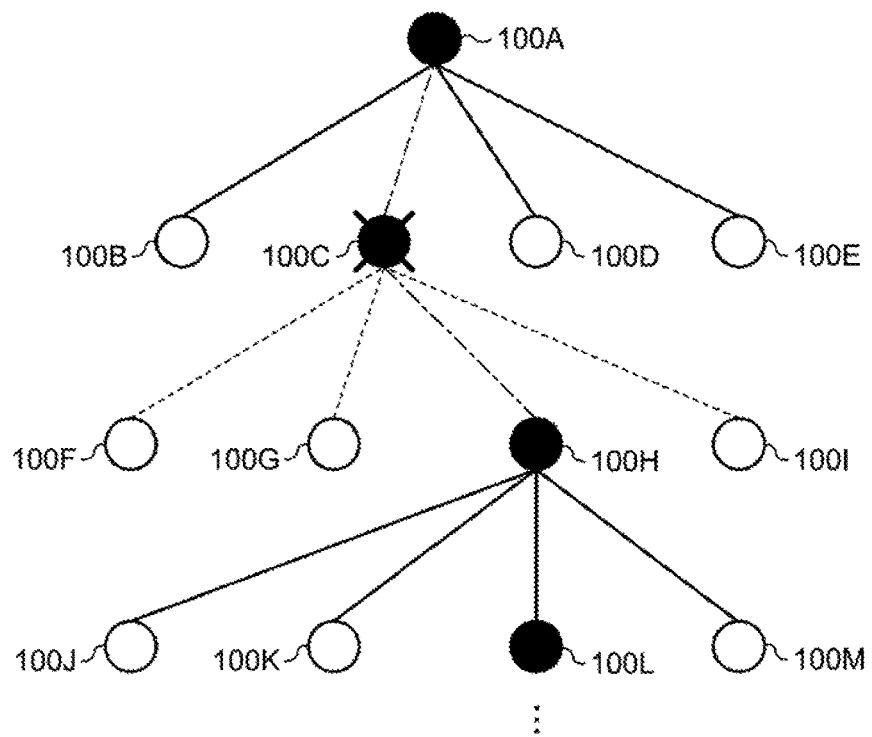
FIG. 2 is an explanatory view (1) illustrating the processing of a network according to an embodiment.

A description will now be made to an example of the processing of a network according to this embodiment. FIGS. 2 to 13 are an explanatory view illustrating the processing of a network according to this embodiment. As illustrated in FIG. 2, the node 100A executes wireless communications with the nodes 100B to 100E serving as a child node, and then when the wireless communications have been executed unsuccessfully for a certain number of times or more, determines that the associated child node has failed. The node 100A starts to reconstruct a network when the failed child node is a sink node. For example, when the node 100C has failed, the node 100A starts to reconstruct a network.

Now, a description will be directed to FIG. 3. When having detected a failure in a sink node, the node 100A transmits "neighborhood exploration request information" to a child node. For example, the node 100A transmits a neighborhood exploration request information 50a to the nodes 100B, 100D, and 100E. The neighborhood exploration request information 50a serves to request the child nodes to conduct neighborhood exploration. The neighborhood exploration request information 50a includes identification information for uniquely identifying a sender node. The identification information corresponds to, for example, the Media Access Control (MAC) address of the sender node.

Now, a description will be directed to FIG. 4. The node that has received the neighborhood exploration request broadcasts "a neighborhood exploration signal." For example, when having received the neighborhood exploration request information from the node 100A, the node 100D broadcasts a neighborhood exploration signal 50b. The neighborhood exploration signal 50b includes the identification information that uniquely identifies the sender node. The identification information corresponds to, for example, the MAC address of the sender node.

Figure 5:
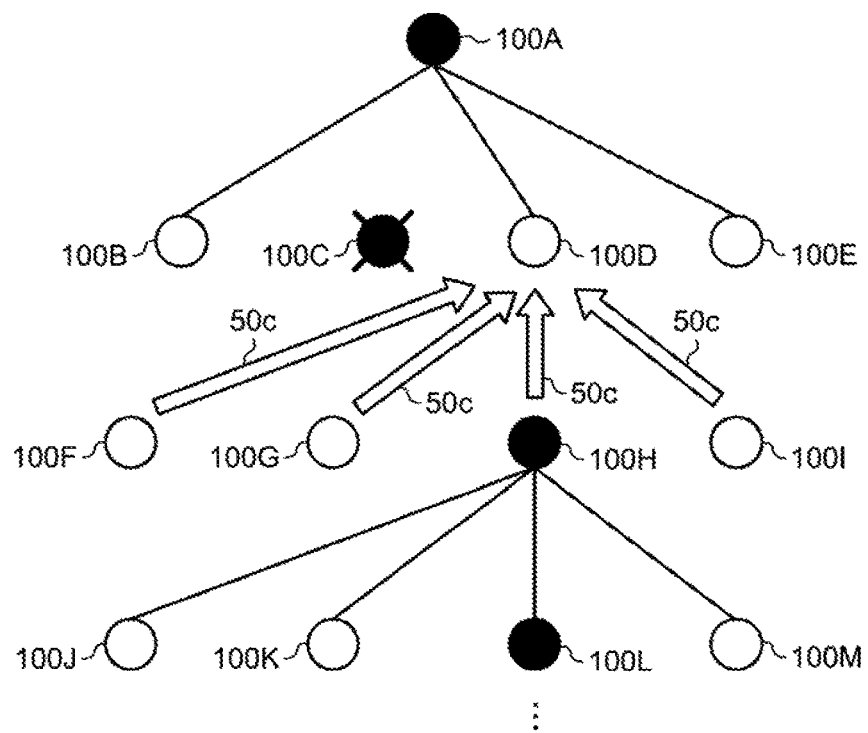
FIG. 5 is an explanatory view (4) illustrating the processing of a network according to an embodiment.

Now, a description will be directed to FIG. 5. The node that has received the neighborhood exploration signal transmits "the neighborhood exploration response information" to the sender node of the neighborhood exploration signal. For example, when having received the neighborhood exploration signal from the node 100D, the node 100H transmits the neighborhood exploration response information to the node 100D. The neighborhood exploration response information includes the identification information for uniquely identifying the sender node, the information indicative of whether the sender node of the neighborhood exploration response information is a sink node, and the information for uniquely identifying the parent node of the sender node of the neighborhood exploration response information.

For example, in the neighborhood exploration response information that the node 100H transmits to the node 100D, the identification information of the sender node is the MAC address of the node 100H. Since the node 100H is a sink node, the neighborhood exploration response information includes the information that the node 100H is a sink node. Furthermore, since the parent node of the node 100H is the node 100C, the identification information of the parent node that is set to the neighborhood exploration response information is the MAC address of the node 100C.

Likewise, the other nodes 100F, 100G, and 100I that have received the neighborhood exploration signal also transmit neighborhood exploration response information 50c to the node 100D. Since the nodes 100F, 100G, and 100I are not a sink node, the neighborhood exploration response information 50c that is transmitted to the nodes 100F, 100G, and 100I includes the information that the node is not a sink node.

Figure 6:
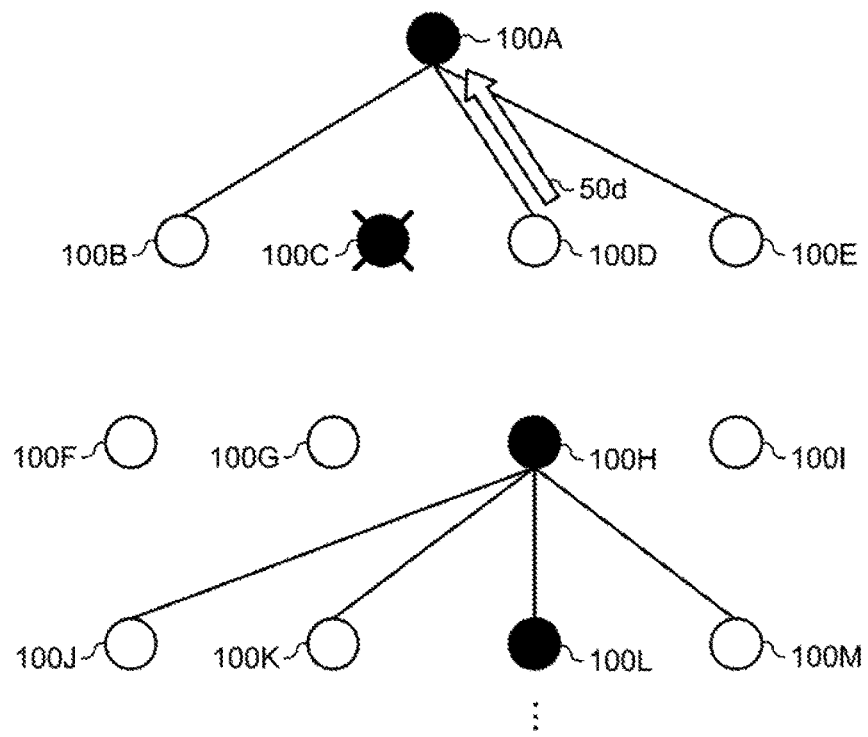
FIG. 6 is an explanatory view (5) illustrating the processing of a network according to an embodiment.

Now, a description will be directed to FIG. 6. The node that has broadcast the neighborhood exploration signal receives the neighborhood exploration response information for a certain period of time after the broadcast. On the basis of the received neighborhood exploration response information, the node generates "the neighborhood exploration report information," and then transmits the generated neighborhood exploration report information to the parent node. The neighborhood exploration report information includes the identification information for uniquely identifying the sender node, and the list of nodes that have transmitted the neighborhood exploration response information. This list is associated, for example, with the identification information of a node and the information indicative of whether the node is a sink node.

For example, after having received the neighborhood exploration response information from the nodes 100F to 100I, the node 100D generates neighborhood exploration report information 50d, which is then transmitted to the node 100A. The neighborhood exploration report information 50d is provided with the MAC address of the node 100D set as the identification information of the sender node. Furthermore, the list in the neighborhood exploration report information 50d includes the MAC address of the nodes 100F, 100G, 100H, and 100I. The list includes the information that the node 100H is a sink node, but the nodes 100F, 100G, and 100I are not a sink node.

Note that the node that transmits the neighborhood exploration report information to the parent node sends the information on the quality of communications between the node and the child node to the parent node. The communication quality corresponds to the received radio wave power (dBm). For example, the node 100D transmits the communication quality information between the node 100D and each of the child nodes 100F to 100I to the node 100A. The node may also employ any conventional technique to measure the quality of communications with a target node.

The node 100A receives the neighborhood exploration report information, and on the basis of the neighborhood exploration report information, determines a node serving as a substitute for a failed sink node. For example, the node 100A determines a child node satisfying the first condition below as a node serving as a substitute for the failed sink node. When there exists no child node satisfying the first condition, the node 100A determines a child node satisfying the second condition as a node serving as a substitute for the failed sink node.

The first condition is that a node which is capable of communicating with a non-connected sink node and of which quality of communications with the non-connected sink node is equal to or greater than a threshold value is employed as a node serving as a substitute for a failed sink node. Here, the non-connected sink node is subordinate to the failed sink node. For example, in the example illustrated in FIG. 2, with the failed sink node being the node 100C, the node 100H is a non-connected sink node.

The second condition is that a node which is capable of communicating with the greatest number of non-connected nodes and of which quality of communications with the non-connected nodes is equal to or greater than a threshold value is employed as a node serving as a substitute for a failed sink node. Here, the non-connected nodes correspond to those other than a sink node among the nodes subordinate to the failed sink node. In the example illustrated in FIG. 2, with the failed sink node being the node 100C, the nodes 100F, 100G, and 100I are a non-connected node.

Figure 9:
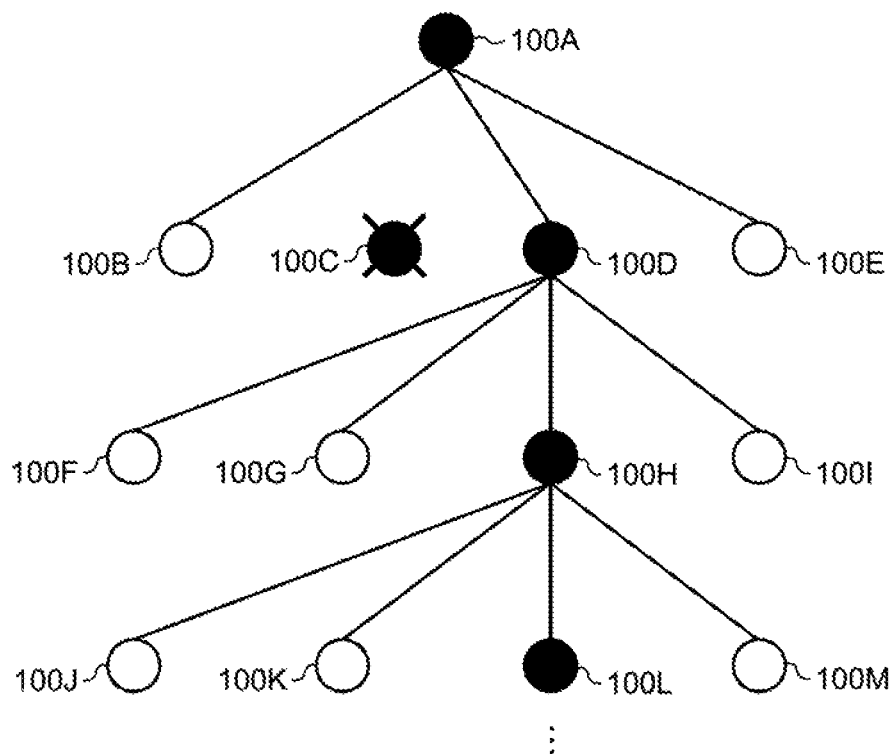
FIG. 9 is an explanatory view (8) illustrating the processing of a network according to an embodiment.

In the descriptions of FIG. 7 onward, a description will be made to the processing separately for the cases where there exists a node satisfying the first condition and where there exists no node satisfying the first condition. FIGS. 7 to 9 illustrate the processing for the case where the node 100A has determined that there exists a node satisfying the first condition. FIGS. 10 to 13 illustrate the processing for the case where the node 100A has determined that there exists no node satisfying the first condition.

Now, a description will be directed to FIG. 7. In the example illustrated in FIG. 7, there exists a node satisfying the first condition, and the node satisfying the first condition is defined as the node 100D. The node 100A transmits sink node formation command information 50e to the node 100D. The sink node formation command information includes the identification information of a non-connected sink node. For example, the identification information of a non-connected sink node corresponds to the MAC address of the non-connected sink node. The node 100A sets the MAC address of the node 100H to the identification information of the non-connected sink node in the sink node formation command information.

Now, a description will be directed to FIG. 8. The node that has received the sink node formation command information 50e changes the role of the node to that of a sink node. When having received the sink node formation command information 50e, the node 100D changes the function of the node 100D to that of a sink node. The node 100D constructs a network by connecting to the nodes 100F to 100I on the basis of the predetermined procedure of each communication scheme.

Here, by way of example, a description will be made to the case where the node 100D now serving as a sink node constructs a network on the basis of the procedure of ZigBee (registered trademark, the same shall apply hereinafter.) The node 100D receives a beacon signal broadcast by the nodes 100F to 100I. When having received the beacon signal at the time of constructing a network, the node 100D transmits response information to the nodes 100F to 100I. When having received the response information, the nodes 100F to 100I transmit an initiation request to the node 100D, and the node 100D receives the initiation request.

Now, a description will be directed to FIG. 9. As illustrated in FIG. 9, the node 100D receives the initiation request from the nodes 100F to 100I and then acknowledges the initiation request, thereby allowing the node 100D to be connected to the nodes 100F to 100I and construct a network.

Figure 10:
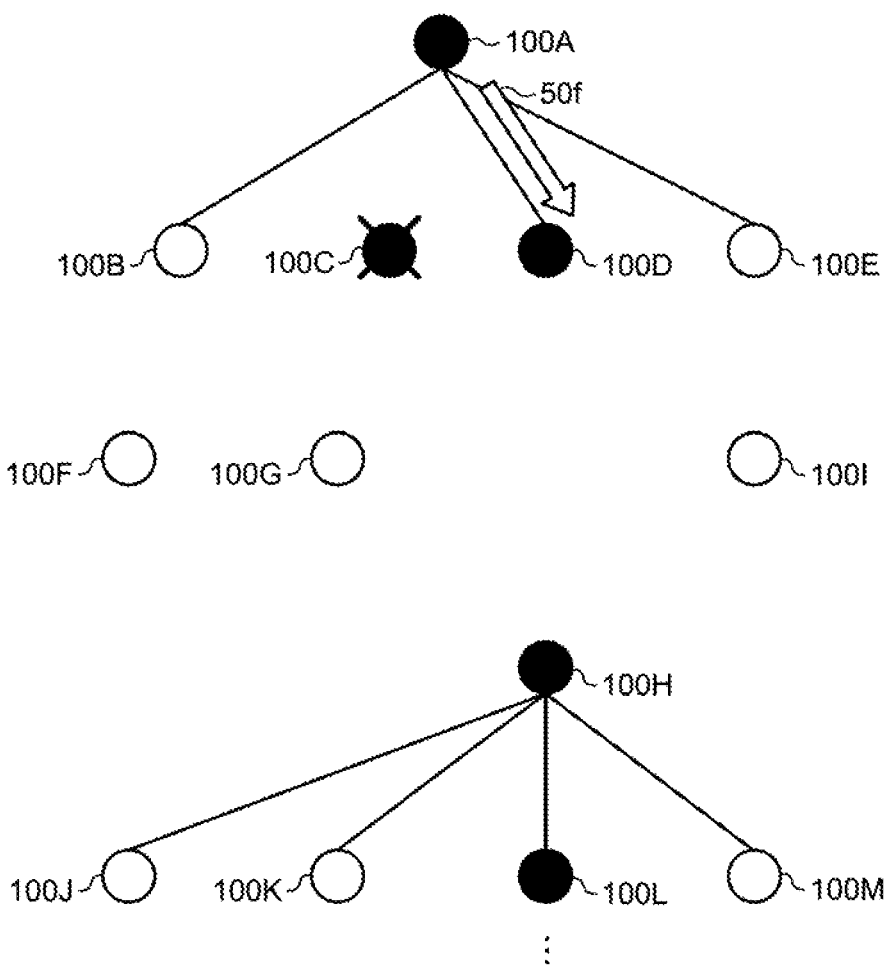
FIG. 10 is an explanatory view (9) illustrating the processing of a network according to an embodiment.

Now, a description will be directed to FIG. 10. In the example illustrated in FIG. 10, it is assumed that there exists no node satisfying the first condition, and a node of those satisfying the second condition that is capable of communicating with the greatest number of non-connected nodes is the node 100D. The node 100A transmits the sink node formation command information 50f to the node 100D. When there exists no node satisfying the first condition, the sink node formation command information does not include the identification information of a non-connected sink node.

Now, a description will be directed to FIG. 11. The node that has received the sink node formation command information 50f changes the role of the node to that of a sink node. When having received the sink node formation command information 50f, the node 100D changes to the function of the node 100D to that of the sink node. The node 100D constructs a network by connecting to the nodes 100F, 100G, and 100I on the basis of the predetermined procedure of each communication scheme. The procedure for constructing a network is the same as ZigBee illustrated in FIG. 8.

Now, a description will be directed to FIG. 12. Like the node 100A illustrated in FIG. 3, the node 100D transmits the neighborhood exploration request information 50g to a child node. For example, the node 100D transmits the neighborhood exploration request information 50g to the nodes 100F, 100G, and 100I. The node 100D receives the neighborhood exploration report information from the nodes 100F, 100G, and 100I. The processing that is performed until the node 100D receives the neighborhood exploration report information after having transmitted the neighborhood exploration request information 50g corresponds to the processing described with reference to FIGS. 3 to 6.

The node 100D receives the neighborhood exploration report information and determines the node to be set as a sink node on the basis of the neighborhood exploration report information. The node 100D determines the child node satisfying the aforementioned first condition as a node serving as a substitute for the failed sink node. When there exists no child node satisfying the first condition, the node 100A determines a child node satisfying the second condition as a node serving as a substitute for the failed sink node.

For example, it is assumed that there exists a child node satisfying the first condition and the child node is the node 100G. In this case, the node 100D transmits the sink node formation command information to the node 100G.

Figure 13:
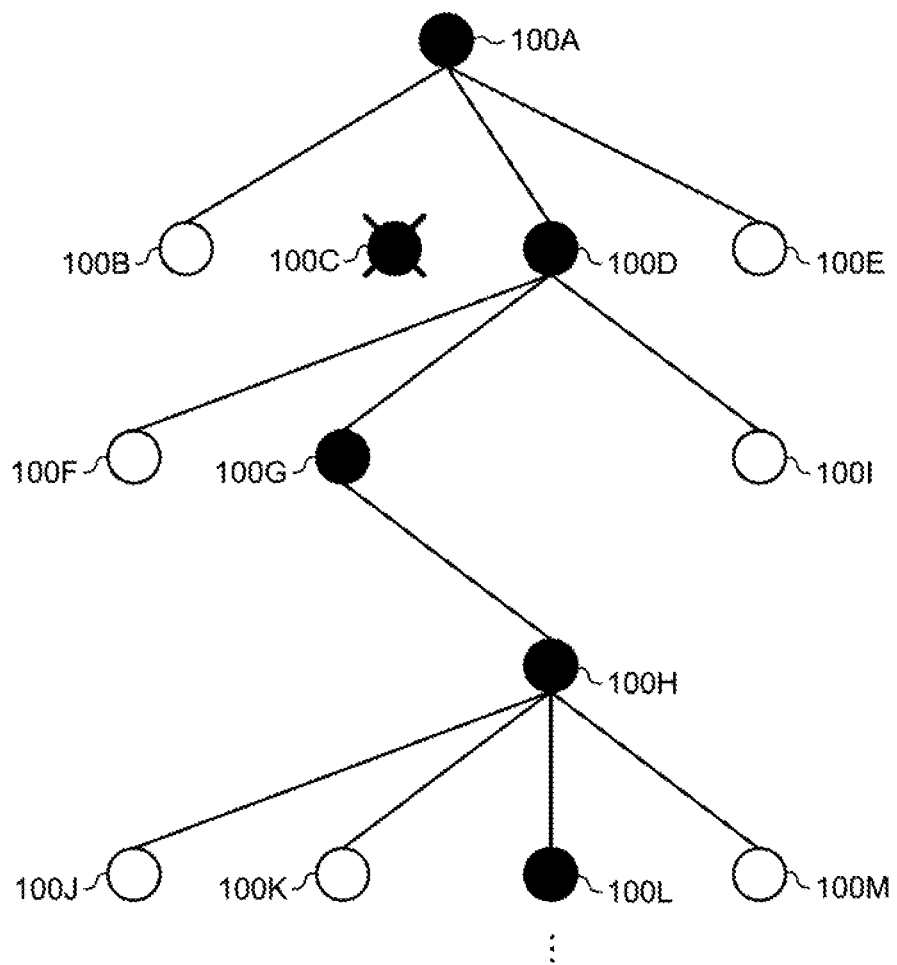
FIG. 13 is an explanatory view (12) illustrating the processing of a network according to an embodiment.

Now, a description will be directed to FIG. 13. The node 100G having received the sink node formation command information changes the role of the node 100G to that of a sink node, and then constructs a network by connecting to the node 100H on the basis of the predetermined procedure of each communication scheme. The processing that the node 100G performs to construct a network is the same as that of the node 100D illustrated in FIG. 8 and FIG. 9.

Incidentally, when there exists no node satisfying the first condition, the node 100 reconstructs a network by repeatedly executing the processing illustrated in FIG. 10, FIG. 11, and FIG. 12 until a node satisfying the first condition is found.

The node 100 according to this embodiment reconstructs a network by executing the processing illustrated in FIG. 2 to FIG. 13 when a failure has occurred in the sink node. Since the processing for reconstructing a network is executed without enhancing the radio wave output in the tree type network structure with no change made to the structure, the robustness of the network can be enhanced without an increase in cost during operation.

Figure 14:
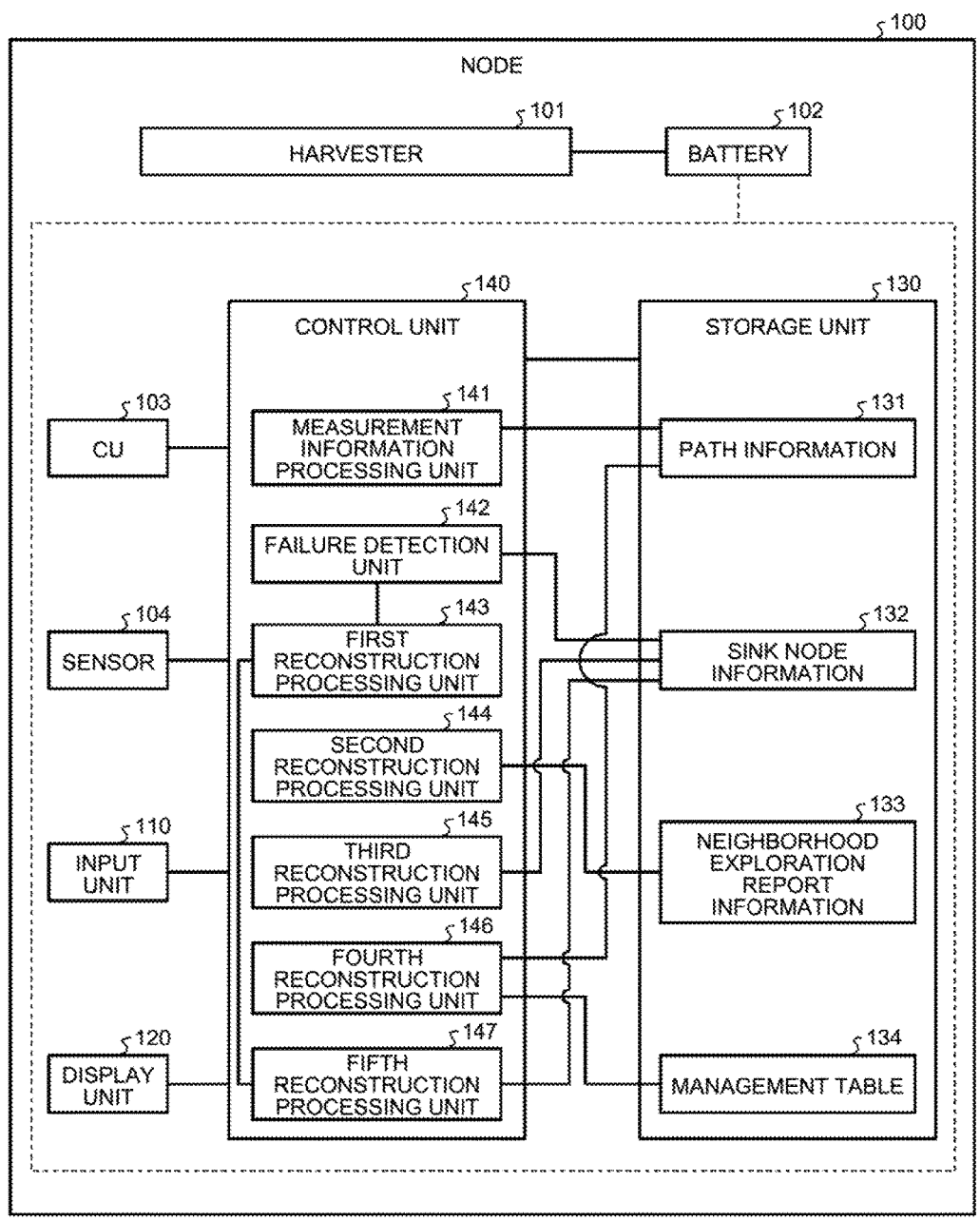
FIG. 14 is a function block diagram illustrating the configuration of a node according to an embodiment.

Now, a description will be made to an example of the configuration of the node 100 for executing the processing illustrated in FIG. 1 to FIG. 13. FIG. 14 is a functional block diagram illustrating the configuration of a node according to this embodiment. As illustrated in FIG. 14, the node 100 has a harvester 101, a battery 102, a communication unit (CU) 103, a sensor 104, an input unit 110, a display unit 120, a storage unit 130, and a control unit 140.

The harvester 101 is a device that acquires energy such as heat, vibration, and radio frequency (RF) waves that an external object generates, and then converts the acquired energy into electric power. For example, the harvester 101 corresponds to the solar panel. The harvester 101 outputs electric power to the battery 102.

The battery 102 is a device for accumulating the electric power acquired from the harvester 101. The electric power accumulated in the battery 102 is supplied to each processing unit of the node 100 by a power management unit (PMU) (not illustrated).

The CU 103 is a device for performing wireless communications with another node. The CU 103 corresponds to a communication device. The control unit 140, to be discussed later, exchanges data with another node via the CU 103.

The sensor 104 acquires measurement information around the node 100. For example, the measurement information acquired by the sensor 104 includes information such as the ambient temperature, humidity, and the percentage of water content of soil around the node 100. The sensor 104 outputs the measurement information to the control unit 140.

The input unit 110 is an input device for entering various types of information into the node 100. For example, the input unit 110 corresponds to, for example, a touch panel or an input button.

The display unit 120 is a display device for displaying information outputted from the control unit 140. For example, the display unit 120 corresponds to, for example, a touch panel or a liquid crystal display.

The storage unit 130 has path information 131, sink node information 132, neighborhood exploration report information 133, and a management table 134. For example, the storage unit 130 corresponds to a storage device like a semiconductor memory device such as a random access memory (RAM), a read only memory (ROM), or a flash memory.

The path information 131 has identification information for identifying the node to which the measurement information is transmitted. The path information 131 is set in advance by an administrator. On the other hand, the path information 131 may also include the information for identifying a child node connected to be subordinate to the node 100 or the information for identifying a parent node connected to the node 100.

The sink node information 132 has the information indicative of whether the node is a sink node. For example, if the flag of the sink node information 132 is "ON," then the node is a sink node. If the flag of the sink node information 132 is "OFF," then the node is not a sink node.

As described with reference to FIG. 4 and FIG. 5, the neighborhood exploration report information 133 is generated on the basis of the neighborhood exploration response information acquired from another node as a result of transmitting the neighborhood exploration signal by the node 100.

FIG. 15 is a view illustrating an example data structure of the neighborhood exploration report information. As illustrated in FIG. 15, the neighborhood exploration report information has sender node identification information, list information, and received electric power. The sender node identification information is provided with the identification information of the node 100. The list information associates the node identification information with a sink node flag. The node identification information is provided with the identification information of a sender node in the neighborhood exploration response information. The sink node flag is the information that is indicative of whether the node corresponding to the node identification information is a sink node. The sink node flag being "ON" indicates that the node corresponding to the node identification information is a sink node. The sink node flag being "OFF" indicates that the node corresponding to the node identification information is not a sink node. The received electric power indicates the received electric power of the signal transmitted from the node corresponding to the node identification information.

As described with reference to FIGS. 3 to 6, the management table 134 holds each piece of neighborhood exploration report information acquired from each of child nodes as a result of transmitting the neighborhood exploration request information by the node 100. FIG. 16 is a view illustrating an example data structure of the management table. As illustrated in FIG. 16, for example, the management table 134 includes each piece of neighborhood exploration report information 134a, 134b, and 134c. The description of each piece of neighborhood exploration report information is the same as the contents described with reference to FIG. 15.

The control unit 140 has a measurement information processing unit 141, a failure detection unit 142, a first reconstruction processing unit 143, a second reconstruction processing unit 144, a third reconstruction processing unit 145, a fourth reconstruction processing unit 146, and a fifth reconstruction processing unit 147. For example, the control unit 140 corresponds to an integrated device such as the Application Specific Integrated Circuit (ASIC) or the Field Programmable Gate Array (FPGA). Furthermore, for example, the control unit 140 corresponds to an electronic circuit such as the Central Processing Unit (CPU) or the Micro Processing Unit (MPU).

The measurement information processing unit 141 acquires measurement information from the sensor 104, and transmits the acquired measurement information to a destination node. The destination node is set in the path information 131.

The failure detection unit 142 is a processing unit for detecting a failure of a child node subordinate to a sink node. The failure detection unit 142 is operated when the node 100 is a sink node on the basis of the sink node information 132. The processing of the failure detection unit 142 corresponds to that of FIG. 2.

The failure detection unit 142 transmits a signal to a child node subordinate to a sink node, and then determines that the wireless communication has been unsuccessful when any ACK signal is not acquired. The failure detection unit 142 detects a failure of a subordinate sink node when wireless communications have been conducted unsuccessfully for a certain number of times or more. When having detected a failure in a sink node, the failure detection unit 142 outputs a network reconstruction command to the first reconstruction processing unit 143.

When having acquired the network reconstruction command from the failure detection unit 142, the first reconstruction processing unit 143 transmits the neighborhood exploration request information to a child node. The processing of the first reconstruction processing unit 143 corresponds to that of FIG. 3.

The first reconstruction processing unit 143 sets the identification information of the node 100 as the identification information of a sender node in the neighborhood exploration request information, and then transmits the neighborhood exploration request information to a child node.

When having received the neighborhood exploration request information from another node, the second reconstruction processing unit 144 broadcasts the neighborhood exploration signal. The neighborhood exploration signal includes the information for identifying a sender node. After having broadcast the neighborhood exploration signal, the second reconstruction processing unit 144 receives the neighborhood exploration response information from each node, and then generates the neighborhood exploration report information 133 on the basis of the received neighborhood exploration response information. The second reconstruction processing unit 144 transmits the generated neighborhood exploration report information 133 to the sender node of the neighborhood exploration request information. The processing of the second reconstruction processing unit 144 corresponds to that illustrated in FIG. 4 and FIG. 6.

When having received the neighborhood exploration signal broadcast by another node, the third reconstruction processing unit 145 transmits the neighborhood exploration response information to the sender node of the neighborhood exploration signal. The processing of the third reconstruction processing unit 145 corresponds to that illustrated in FIG. 5.

When having received the neighborhood exploration signal, the third reconstruction processing unit 145 sets the information indicative of whether the node 100 is a sink node to the neighborhood exploration response information. The third reconstruction processing unit 145 refers to the sink node information 132 and then determines whether the node 100 is a sink node. Furthermore, the third reconstruction processing unit 145 also sets, to the neighborhood exploration response information, the information for identifying the sender node of the neighborhood exploration response information and the information for identifying the parent node of the sender node.

The fourth reconstruction processing unit 146 receives the neighborhood exploration report information from each child node and registers the received neighborhood exploration report information with the management table 134. The fourth reconstruction processing unit 146 determines a node serving as a substitute for a failed sink node on the basis of each neighborhood exploration report information registered with the management table 134.

The fourth reconstruction processing unit 146 determines, on the basis of the management table 134, whether there exists a child node satisfying the first condition. Now, a description will be made below to the processing of the fourth reconstruction processing unit 146 separately in the cases where there exists a child node satisfying the first condition and where there exists no one.

A description will be made to the processing for the case where there exists a child node satisfying the first condition. The processing of the fourth reconstruction processing unit 146 when there exists a child node satisfying the first condition corresponds to that of FIG. 7. The fourth reconstruction processing unit 146 sets the identification information of a non-connected sink node to the sink node formation command information. For example, as illustrated in FIG. 16, when a child node satisfying the first condition is the node 100D, the non-connected sink node is the node 100H. Thus, the fourth reconstruction processing unit 146 sets the MAC address of the node 100H as the identification information of the non-connected sink node set to the sink node formation command information to be transmitted to the node 100D. The fourth reconstruction processing unit 146 transmits the sink node formation command information to the child node satisfying the first condition.

When there exist a plurality of child nodes satisfying the first condition, the fourth reconstruction processing unit 146 refers to the management table 134 and then transmits the sink node formation command information to the child node that is provided with the greatest electric power received from the non-connected sink node.

A description will be made to the processing for the case where there exists no child node satisfying the first condition. The processing of the fourth reconstruction processing unit 146 for the case where there exists no child node satisfying the first condition corresponds to that of FIG. 10. On the basis of the management table 134, the fourth reconstruction processing unit 146 identifies a node among those satisfying the second condition that is capable of communicating with the greatest number of non-connected nodes. The fourth reconstruction processing unit 146 transmits the sink node formation command information to the identified node. The sink node formation command information transmitted to the node satisfying the second condition does not include the identification information of the non-connected sink node.

When having received the sink node formation command information from another node, the fifth reconstruction processing unit 147 constructs a network with subordinate child nodes. A description will be made to the processing of the fifth reconstruction processing unit 147 separately for the cases where the identification information of a non-connected sink node is and is not included in the sink node formation command information.

A description will be made to the case where the identification information of a non-connected sink node is included in the sink node formation command information. The processing of the fifth reconstruction processing unit 147 for the case where the identification information of a non-connected sink node is included in the sink node formation command information corresponds to that of FIG. 8 and FIG. 9. When having acquired the sink node formation command information, the fifth reconstruction processing unit 147 accesses the sink node information 132 and then sets the flag of the sink node information to "ON," thereby changing the function of the node 100 to that of a sink node. Furthermore, the fifth reconstruction processing unit 147 constructs a network by connecting to a child node on the basis of the predetermined procedure of each communication scheme. The fifth reconstruction processing unit 147 updates the path information 131 on the basis of the constructed network.

A description will be made to the case where the identification information of a non-connected sink node is not included in the sink node formation command information. The processing of the fifth reconstruction processing unit 147 for the case where the identification information of a non-connected sink node is not included in the sink node formation command information corresponds to that of FIG. 11 and FIG. 12. The fifth reconstruction processing unit 147 accesses the sink node information 132 and then sets the flag of the sink node information to "ON," thereby changing the function of the node to that of a sink node. Furthermore, the fifth reconstruction processing unit 147 constructs a network by connecting to a child node on the basis of the predetermined procedure of each communication scheme. The fifth reconstruction processing unit 147 updates the path information 131 on the basis of the constructed network.

Subsequently, the fifth reconstruction processing unit 147 requests the first reconstruction processing unit 143 to transmit the neighborhood exploration request information. The first reconstruction processing unit 143 having received the request to transmit the neighborhood exploration request information sends the neighborhood exploration request information to a child node.

Figure 17:
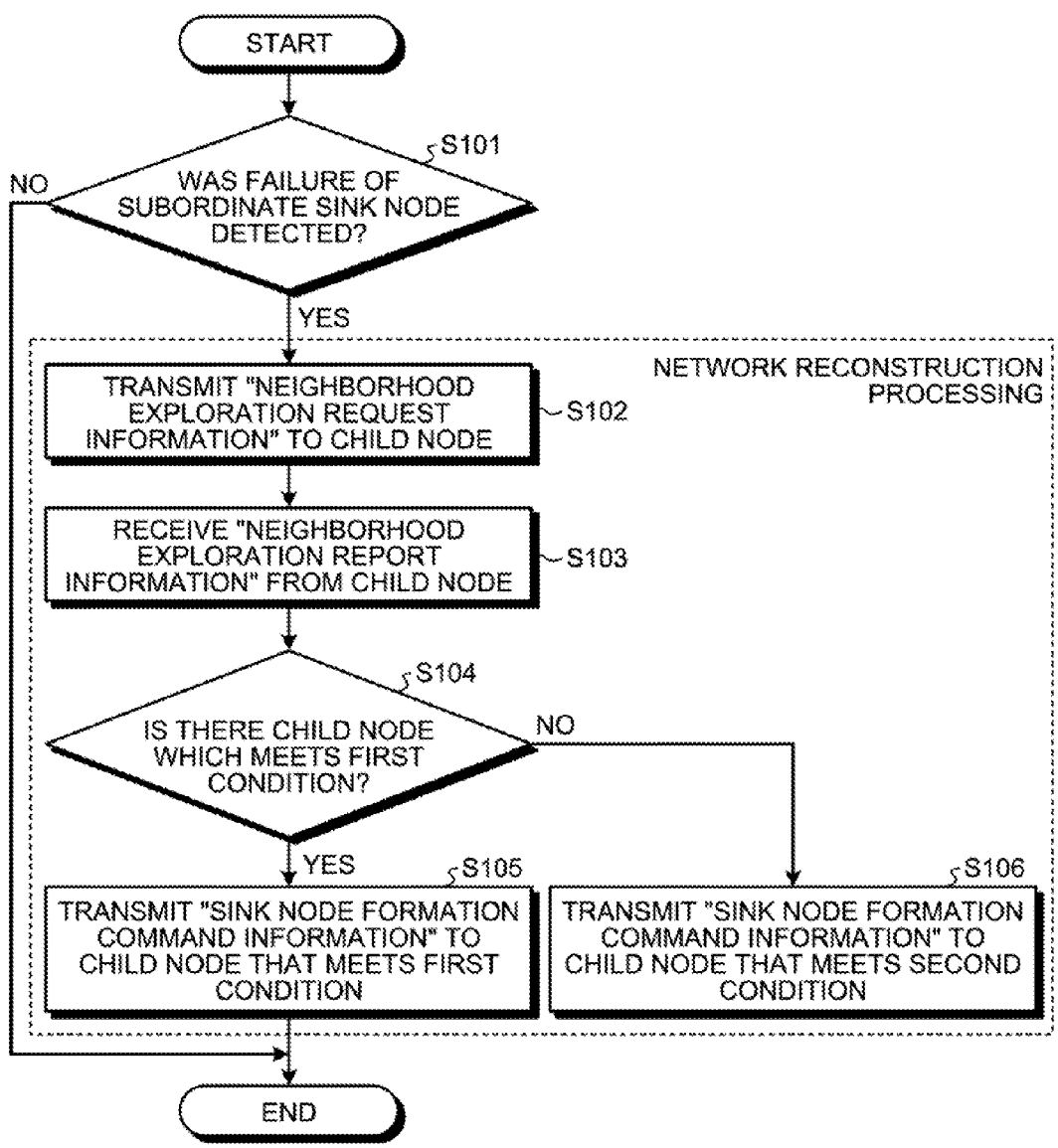
FIG. 17 is a flowchart (1) of a node processing procedure according to an embodiment.
Figure 18:
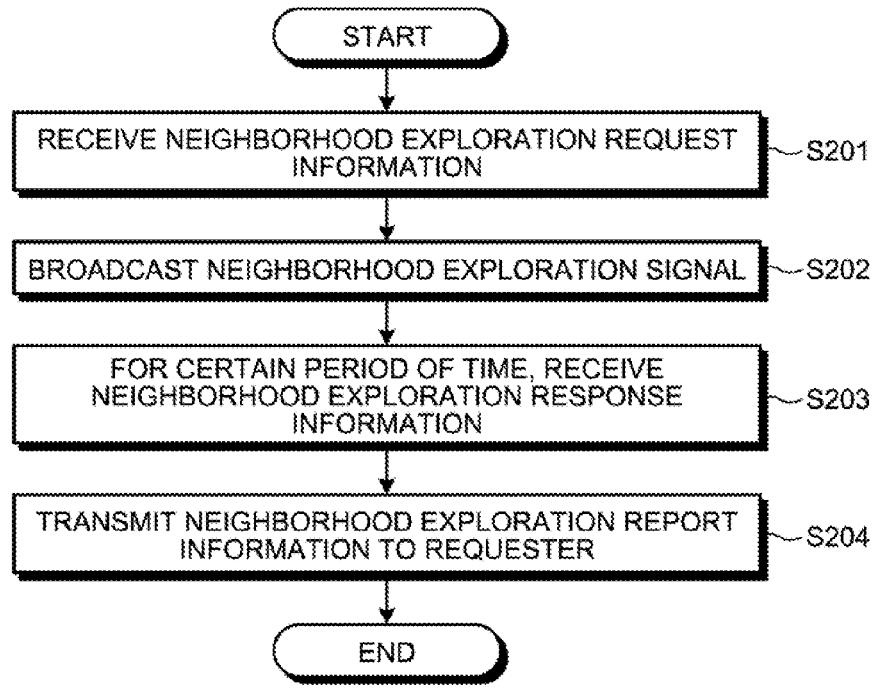
FIG. 18 is a flowchart (2) of a node processing procedure according to an embodiment.
Figure 19:
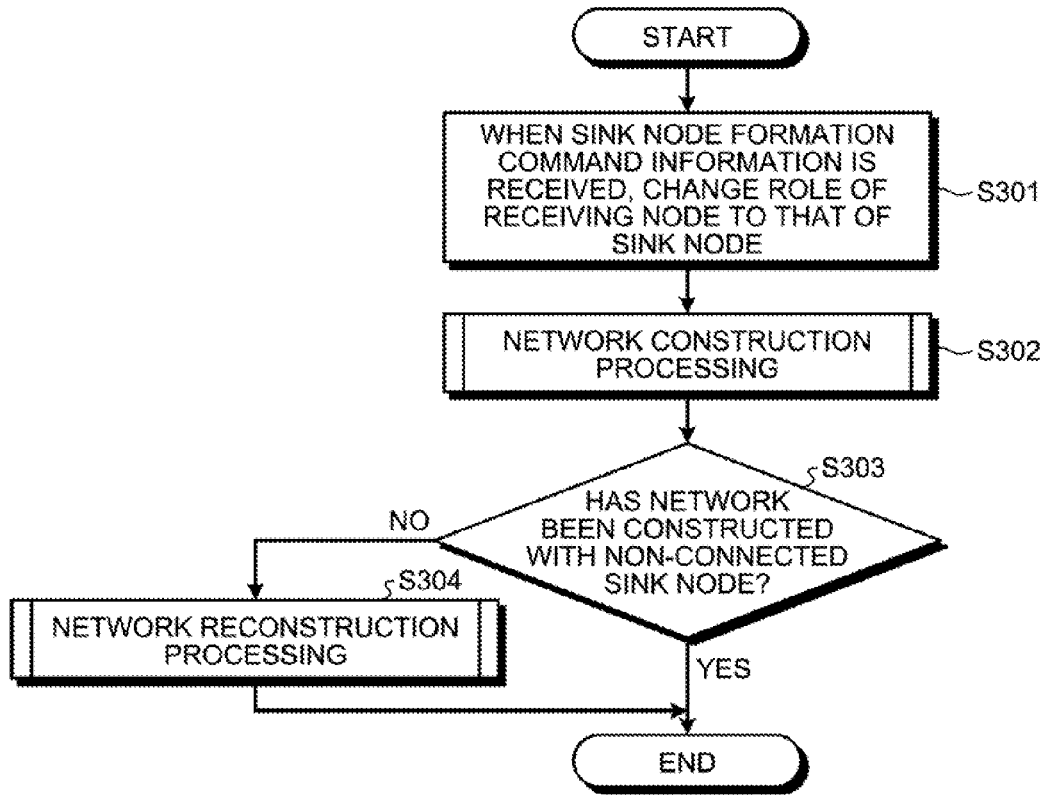
FIG. 19 is a flowchart (3) of a node processing procedure according to an embodiment.

Now, a description will be made to the processing procedure of the node 100 according to this embodiment. FIGS. 17 to 19 are each a flowchart indicative of the processing procedure of a node according to this embodiment.

A description will be made to FIG. 17. The processing illustrated in FIG. 17 is the processing procedure for the case where the node 100 is a sink node and has detected a failure of a subordinate sink node. The failure detection unit 142 of the node 100 determines whether a failure of a subordinate sink node has been detected (Step S101).

When having detected no failure of a subordinate sink node (No in Step S101), the failure detection unit 142 of the node 100 ends the processing. On the other hand, when the failure detection unit 142 of the node 100 has detected a failure of a subordinate sink node (Yes in Step S101), the node 100 executes the network reconstruction processing. A description will be made below to the network reconstruction processing.

The first reconstruction processing unit 143 of the node 100 transmits "the neighborhood exploration request information" to a child node (Step S102). The fourth reconstruction processing unit 146 of the node 100 receives "the neighborhood exploration report information" from a child node (Step S103). The fourth reconstruction processing unit 146 determines whether there exists a child node satisfying the first condition (Step S104).

When there exists a child node satisfying the first condition (Yes in Step S104), the fourth reconstruction processing unit 146 transmits "the sink node formation command information" to the child node satisfying the first condition (Step S105). On the other hand, when there exists no child node satisfying the first condition (No in Step S104), the fourth reconstruction processing unit 146 transmits "the sink node formation command information" to the child node satisfying the second condition (Step S106).

A description will be made to FIG. 18. The processing illustrated in FIG. 18 is the processing procedure for the case where the node 100 is not a sink node and has received the neighborhood exploration request information from another node. The second reconstruction processing unit 144 of the node 100 receives the neighborhood exploration request information from another node (Step S201).

The second reconstruction processing unit 144 broadcasts the neighborhood exploration signal (Step S202) and then receives the neighborhood exploration response information from another node for a certain period of time (Step S203). The second reconstruction processing unit 144 transmits the neighborhood exploration report information to the requester of the neighborhood exploration request information (Step S204).

A description will be made to FIG. 19. The processing illustrated in FIG. 19 is a processing procedure for the case where the node 100 has received the sink node formation command information. When having received the sink node formation command information from another node, the fifth reconstruction processing unit 147 of the node 100 changes the role of the node 100 to that of a sink node (Step S301).

The fifth reconstruction processing unit 147 performs the network construction processing (Step S302). The fifth reconstruction processing unit 147 determines whether a non-connected sink node has been connected (Step S303). When a non-connected sink node has been connected (Yes in Step S303), the fifth reconstruction processing unit 147 ends the processing.

On the other hand, when a non-connected sink node has not been connected (No in Step S303), the node 100 executes the network reconstruction processing (Step S304). The network reconstruction processing of Step S304 corresponds to the network reconstruction processing in Step S110 of FIG. 17.

Figure 20:
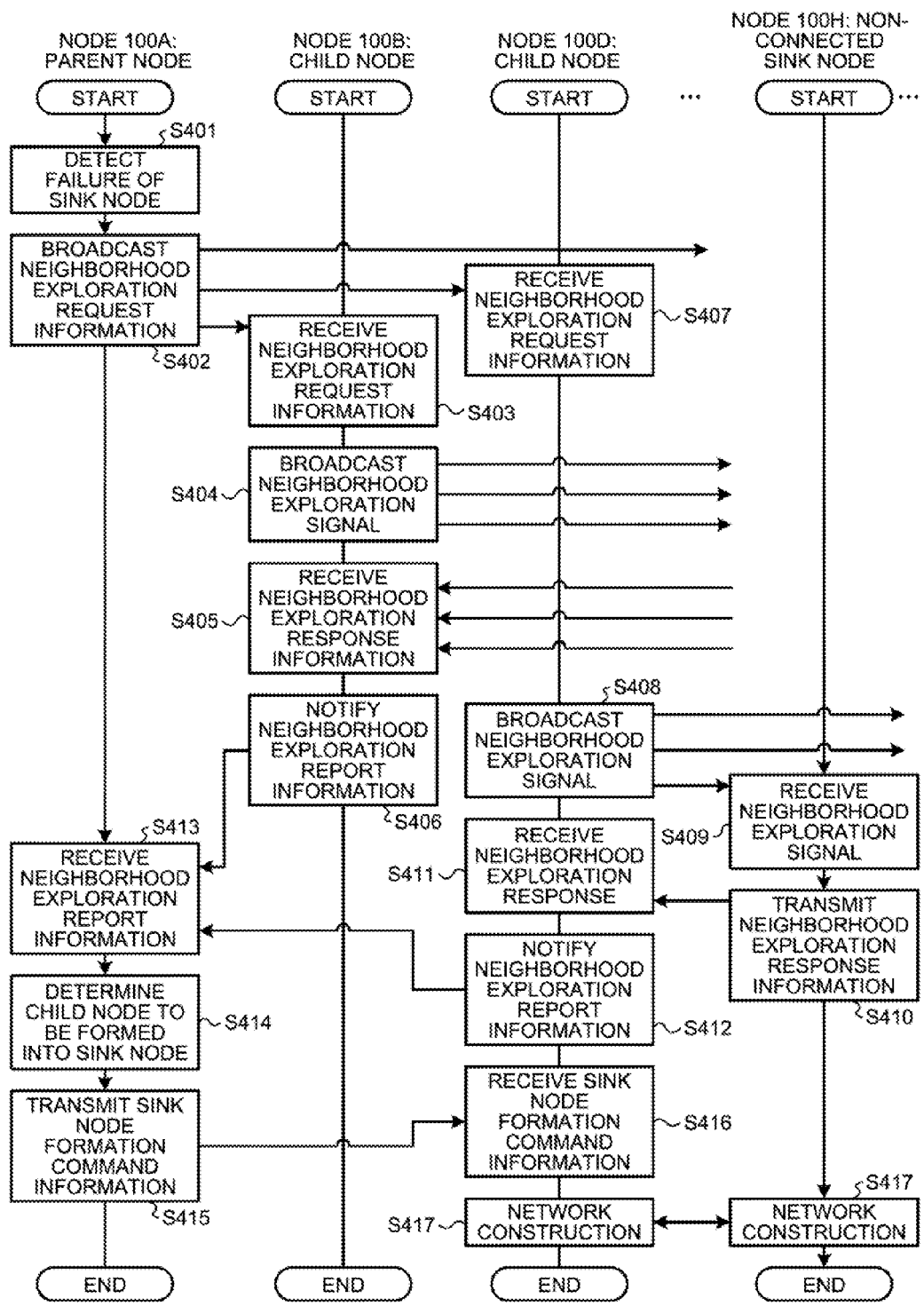
FIG. 20 is a sequence diagram illustrating the processing when a failure is detected in a network according to an embodiment.

FIG. 20 is a sequence diagram indicative of the processing for the case where a failure has been detected in a network according to this embodiment. In FIG. 20, by way of example, it is assumed that a failure has occurred in the node 100C that is a sink node. Furthermore, in the processing of FIG. 20, for convenience of explanation, a description will be made using the nodes 100A, 100B, 100D, and 100H, but other nodes are also included.

As illustrated in FIG. 20, the node 100A detects a failure of a sink node (Step S401). The node 100A broadcasts the neighborhood exploration request information (Step S402).

The node 100B receives the neighborhood exploration request information from the node 100A (Step S403). The node 100B broadcasts the neighborhood exploration signal (Step S404), and receives the neighborhood exploration response information from another node (Step S405). The node 100B informs the node 100A of the neighborhood exploration report information (Step S406).

The node 100C receives the neighborhood exploration request information from the node 100A (Step S407). The node 100C broadcasts the neighborhood exploration signal (Step S408). The node 100H receives the neighborhood exploration signal (Step S409). The node 100H transmits the neighborhood exploration response information (Step S410).

The node 100D receives a neighborhood exploration response (Step S411). The node 100D informs the node 100A of the neighborhood exploration report information (Step S412).

The node 100A receives the neighborhood exploration report information from a child node (Step S413). The node 100A determines a child node for forming a sink node (Step S414). The node 100A transmits the sink node formation command information to the node 100D (Step S415).

The node 100D receives the sink node formation command information from the node 100A (Step S416). The node 100D constructs a network between the node 100H and another child node (Step S417).

By executing the processing of S401 to S417 illustrated in FIG. 20, it is possible to reconstruct a network even when a failure of a sink node is detected.

Now, a description will be made to the effects of a network according to this embodiment. When having detected a failure of a subordinate sink node, the node 100 transmits the neighborhood exploration request information to each child node, thereby receiving the neighborhood exploration report information from each child node. The node 100 identifies an optimum child node serving as a substitute for the failed sink node on the basis of the neighborhood exploration report information and then transmits the sink node formation command information to the identified child node to form a sink node thereof, thus reconstructing a network. As described above, in this embodiment, it is possible to construct a network, with no change made to the tree type network structure, even without raising the radio wave output of each node, thus enhancing the robustness of the network without an increase in operation costs.

Furthermore, the node 100 according to this embodiment receives the neighborhood exploration report information from each child node and determines, as a node serving as a substitute for a failed sink node, a child node which is capable of communicating with a non-connected sink node and of which quality of communications with the non-connected sink node is equal to or greater than a threshold value. Thus, it is possible to efficiently execute the network reconstruction processing by connecting on a priority basis between the node designated as a sink node and the non-connected sink node.

Furthermore, when there exists no child node communicating with a non-connected sink node, the node 100 according to this embodiment determines, as a node serving as a substitute for a failed sink node, a child node which is capable of communicating with the greatest number of non-connected nodes and of which quality of communications with the non-connected nodes is equal to or greater than a threshold value. Thus, it is possible to set, as a sink node, an optimum child node that can maintain a communication quality equal to or greater than a certain level.

Figure 21:
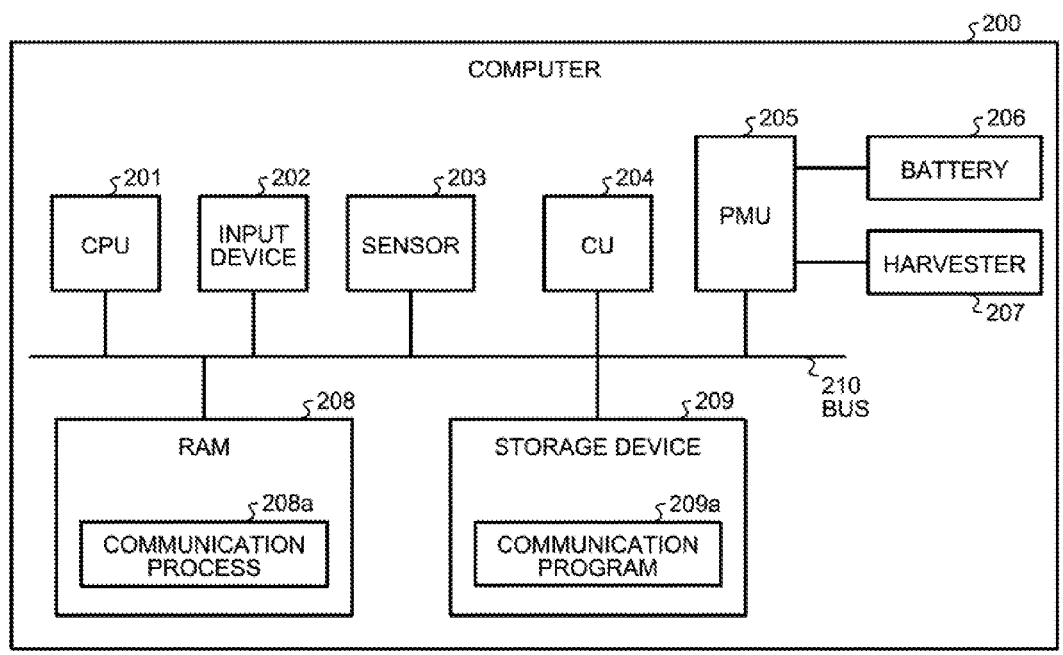
FIG. 21 is a view illustrating an example computer that executes a communication program.
Figure 22:
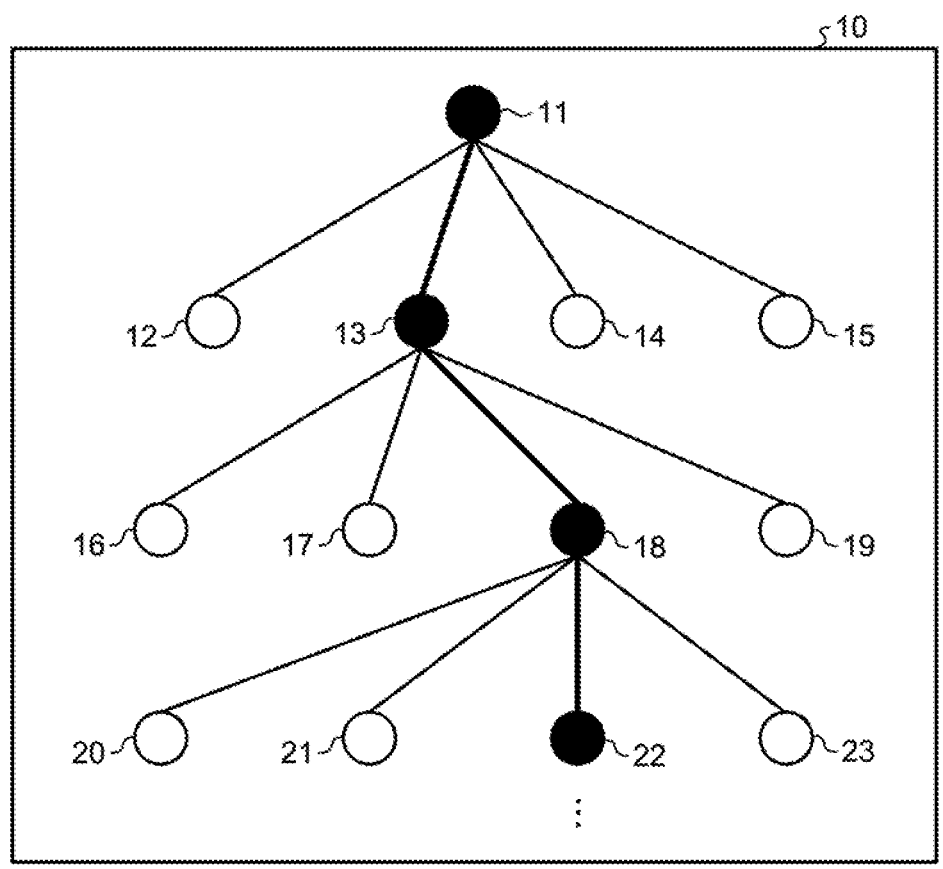
FIG. 22 is an explanatory view (1) illustrating an example tree type network structure.
Figure 23:
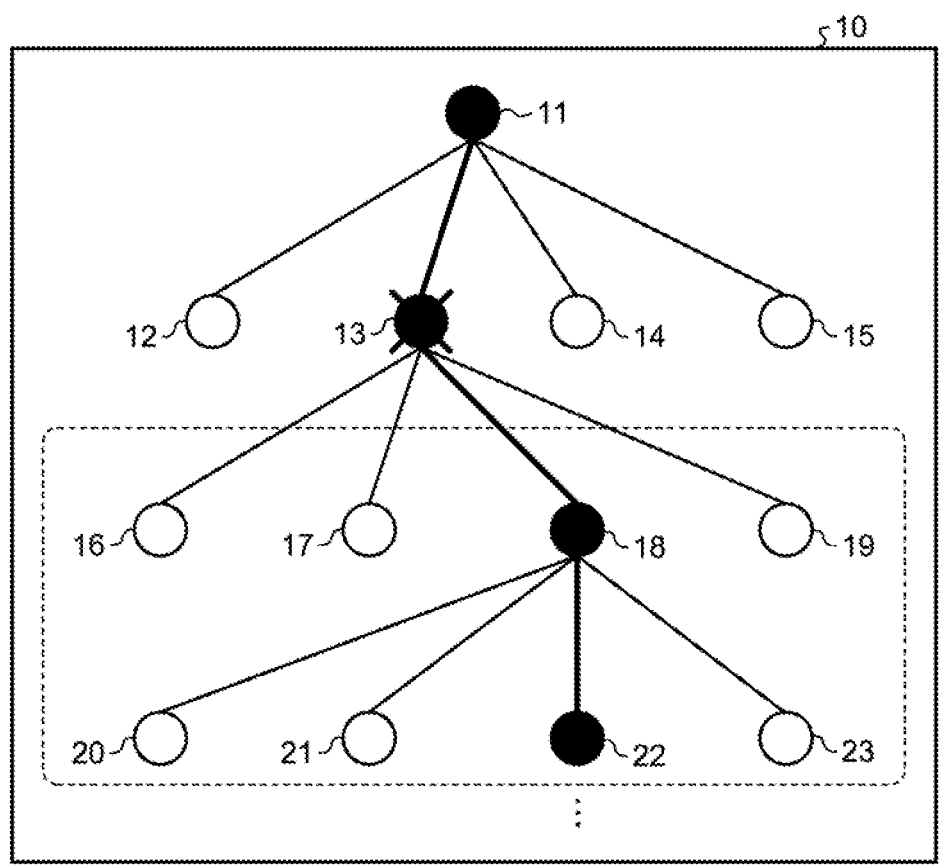
FIG. 23 is an explanatory view illustrating a problem of a tree type network structure.
Figure 24:
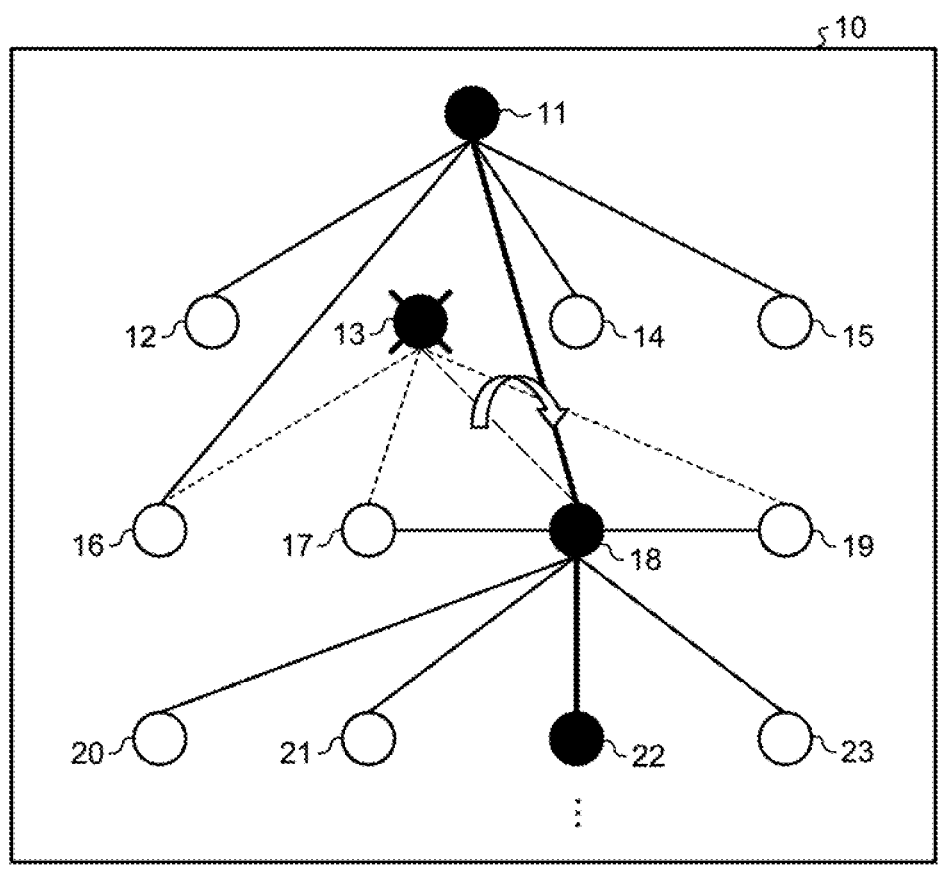
FIG. 24 is an explanatory view (2) illustrating an example tree type network structure.

Now, a description will be made to an example of a computer which executes a communication program that achieves the same function as that of the node 100 illustrated in the aforementioned embodiment. FIG. 21 is a view illustrating an example of a computer for executing a communication program.

As illustrated in FIG. 21, a computer 200 has a CPU 201 for executing various types of computational processing, and an input device 202 for receiving data entered by a user. The computer 200 has a sensor 203 for providing various types of measurement information, and a CU 204 for communicating with another node. The computer 200 has a PMU 205 for controlling a battery 206 and a harvester 207. Furthermore, the computer 200 has a RAM 208 for temporarily storing various types of information, and a storage device 209. Then, each of devices 201 to 209 is connected to a bus 210.

The storage device 209 has a communication program 209a. The CPU 201 reads the communication program 209a and expands the program in a RAM 206. The communication program 209a functions as a communication process 208a.

For example, the processing of the communication process 208a corresponds to the measurement information processing unit 141, the failure detection unit 142, the first reconstruction processing unit 143, the second reconstruction processing unit 144, the third reconstruction processing unit 145, the fourth reconstruction processing unit 146, and the fifth reconstruction processing unit 147.

Note that the communication program 209a has not always to be stored in the storage device 209 from the beginning. For example, the communication program 209a may be stored in a "transportable physical medium" such as a flexible disk (FD), CD-ROM, DVD disk, magneto-optical disc, or IC card, which are inserted into the computer 200. Then, the computer 200 may also be allowed to read and execute the communication program 209a.

According to one embodiment of the present invention, it is possible to enhance the robustness of a network without an increase in cost during operation.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A communication method comprising:
first determining at which a first node included in a first layer determines whether there has occurred a failure in a sink node included in a second layer subordinate to the first layer wherein the first node serves as a sink node in the first layer which directly performs wireless communication with second nodes included in the second layer;

requesting at which the first node requests the second nodes to collect information of third nodes included in a third layer subordinate to the second layer when the first node has determined that there has occurred a failure in the sink node, the information including measured quality of communications with the third nodes; and second determining at which the first node determines a fourth node from among the second nodes serving as a substitute for the failed sink node, the fourth node being determined from the information as being capable of communicating with a sink node included in the third layer and having quality of communications with the sink node being equal to or greater than a threshold value, the fourth node directly performing wireless communication with the third nodes, and determines, when the forth node does not exist, a fifth node from among the second nodes serving as a substitute for the failed sink node, the fifth node being determined from the information as having a number of communicable third nodes therewith being not less than the number other second nodes have and having quality of communications with the communicable third nodes being equal to or greater than the threshold value.

2. A non-transitory computer-readable recoding medium storing therein a program that causes a computer that belongs to a first layer to execute a communication process comprising:

determining whether there has occurred a failure in a sink node included in a second layer subordinate to the first layer, the computer serves as a sink node in the first layer which directly performs wireless communication with second nodes included in the second layer;

requesting the second nodes to collect information of third nodes included in a third layer subordinate to the second layer when it is determined that there has occurred a failure in the sink node, the information including measured quality of communications with the third nodes; and determining a fourth node from among the second nodes serving as a substitute for the failed sink node, the fourth node being determined from the information as being capable of communicating with a sink node included in the third layer and having quality of communications with the sink node being equal to or greater than a threshold value, the fourth node directly performing wireless communication with the third nodes, and determining, when the forth node does not exist, a fifth node from among the second nodes serving as a substitute for the failed sink node, the fifth node being determined from the information as having a number of communicable third nodes therewith being not less than the number other second nodes have and having quality of communications with the communicable third nodes being equal to or greater than the threshold value.

3. A communication system comprising:

a first node included in a first layer that determines whether there has occurred a failure in a sink node included in a second layer subordinate to the first layer wherein the first node serves as a sink node in the first layer which directly performs wireless communication with second nodes included in the second layer, the first node requests the second nodes to collect information of third nodes included in a third layer subordinate to the second layer when the first node determines that there has occurred a failure in the sink node, the information including measured quality of communications with the third nodes, and the first node determines a fourth node from among the second nodes serving as a substitute for the failed sink node, the fourth node being determined from the information as being capable of communicating with a sink node included in the third layer and having quality of communications with the sink node being equal to or greater than a threshold value, the fourth node directly performing wireless communication with the third nodes, and determines, when the forth node does not exist, a fifth node from among the second nodes serving as a substitute for the failed sink node, the fifth node being determined from the information as having a number of communicable third nodes therewith being not less than the number other second nodes have and having quality of communications with the communicable third nodes being equal to or greater than the threshold value.

4. The communication system according to claim 3 wherein the second nodes each collect the information of the third nodes from the third nodes included in the third layer when the second nodes are requested to do so by the first node.

* * * * *